United States Patent

Hanslip

[15] 3,683,163

[45] Aug. 8, 1972

[54] VARIABLE FIELD ADDER

[72] Inventor: Trevor William Hanslip, Stanmore, England

[73] Assignee: International Computers Limited, London, England

[22] Filed: Aug. 20, 1969

[21] Appl. No.: 851,591

[30] Foreign Application Priority Data

Aug. 27, 1968 Great Britain..........40,863/68

[52] U.S. Cl. ..................235/173, 235/175, 235/168, 340/172.5

[51] Int. Cl............................G06f 7/28, G06f 7/385

[58] Field of Search ....235/173, 175, 168; 340/172.5

[56] References Cited

UNITED STATES PATENTS

| | | | |
|---|---|---|---|
| 3,260,840 | 7/1966 | King | 235/169 |
| 3,430,202 | 2/1969 | Downing et al | 340/172.5 |
| 3,439,347 | 4/1969 | Goshorn et al. | 235/168 X |

*Primary Examiner*—Eugene G. Botz
*Assistant Examiner*—James F. Gottman
*Attorney*—Hane & Baxley

[57] ABSTRACT

A technique for adding fields or portions in a fixed word adding system with carry-in and carry-out signals being as if two complete words are added together. A masking register causes two logic circuits to pass particular fields of corresponding words in two word registers. The logic circuits operate to fill the digits of one word outside of the field of that word with binary "1" signals and corresponding digits of the other word with binary O's. The sum of each digit which appears in the adder is a binary "1" so that a carry-in signal may be injected at the lowest order bit position of the adder and extracted from the highest order bit position of the adder in a normal manner. The masking register controls a further logic circuit so that only the added fields are read out of the adder.

4 Claims, 2 Drawing Figures

INVENTOR
TREVOR WILLIAM HANSLIP
BY Hane and Baxley
ATTORNEYS

INVENTOR
TREVOR WILLIAM HANSLIP
BY Hane and Baxley
ATTORNEYS

VARIABLE FIELD ADDER

BACKGROUND OF THE INVENTION

The present invention relates to a variable field adder.

In may computer systems it is necessary to be able to perform arithmetic operations on any one of several different fields within words. A common example is where fixed point and floating point formats are both available, in which case for fixed point format the whole word constitutes one field, and for floating point format the exponent and mantissa portions of the word constitute two further fields. Another example is where a system is designed to emulate one or more other systems having different formats and perhaps different word lengths.

The central feature of an arithmetic unit is commonly an adder. Since one format is virtually always a fixed point format in which the whole word length (except for, say, a couple of bits for sign and overflow) is used for the stored number, a full word length adder is required. For operating on other fields within the word, it is obviously desirable to use a part of this adder if possible. However, difficulties arise since it is normally necessary to be able to feed a carry bit into the lowest order bit of the relevant field and to extract a carry bit from the highest order bit of the field.

An example of an addition technique in which portions of full data words may be added is found in U.S. Pat. No. 3,260,840. In this system, two portions or "-bytes" of each data word may be added together in an adder, and depending on the number of bits involved in the addition, a carry mask circuit (FIG. 2) allows a particular single carry line to be energized. An output from the carry mask circuit is applied through an OR gate and carry latch circuit and is returned to the adder. It is observed however, that when it is desired to add two bytes of each data word, the bytes must be shifted so that the selected bytes are properly aligned for processing in the adder. Various circuitry, namely a second level switch matrix (FIG. 8) is required to effect such a shifting technique.

As will be described in detail, the present invention provides a simple technique for adding fields of full words without resorting to complex circuitry as is found in the prior art.

SUMMARY

According to the present invention, a variable field length adding system includes a fixed word adder having carry circuits, for radix $r$, the adder operable to add fields which are each a part of a word, means for feeding the words to said adder such that the individual digits of each word which are not in the field are set to predetermined values with the sum of corresponding digits being $r - 1$ prior to feeding said words to said adder, said carry circuits operating as for the addition of two complete words.

BRIEF DESCRIPTION OF THE DRAWINGS

One embodiment of the invention will now be described with reference to the accompanying drawing in which.

DESCRIPTION OF THE PREFERRED EMBODIMENTS

Figure 1:
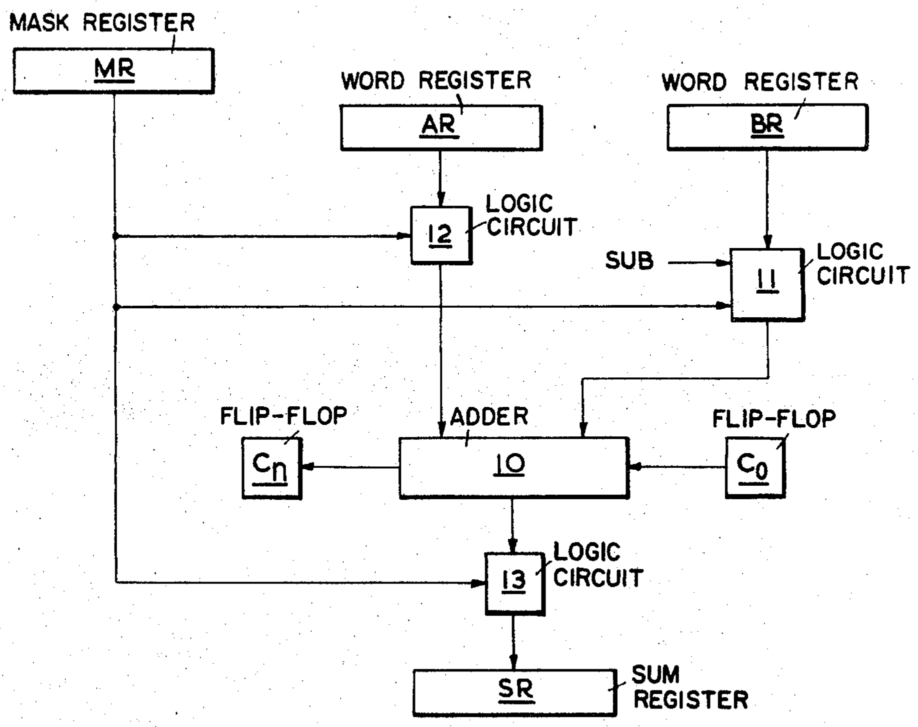
FIG. 1 is a block diagram of the adder system.

Referring to FIG. 1 the adder system includes two word registers AR and BR into which the two numbers to be added together may be placed. These registers feed a full word adder 10 whose outputs are fed to a sum register SR in which the sum of the two words in registers AR and BR will appear. The full word adder 10 is also fed by a "carry in" flip-flop CO, and feeds a carry out flip-flop Cn. The path between registers BR and the adder 10 passes through a logic circuit 11 which is controlled by a signal SUB applied thereto, so that the number in the register BR may be complemented before being applied to the adder 10. The arrangement as described so far is that of a conventional field word length adder/subtractor system.

The system also includes a one word mask register MR which can be set to define the field in the words in registers AR and BR which is to be operated on. Specifically, the mask register is set with 1's in all bit positions within the field and 0's in all other positions. The outputs from the mask register MR are fed to the logic circuit 11, so as to insert 1's into all bit positions outside the defined field while permitting the contents of the defined field in register BR to pass through unchanged. A logic circuit 12 is inserted in the path between register AR and the adder 10, and controlled from register MR to permit the contents of the defined field in AR to pass through unchanged but to delete anything outside that field. A logic circuit 13 is inserted in the path between the adder 10 and the output register SR, controlled like the circuit 12 from register MR to permit the output of adder 10 to pass through in the defined field but to delete everything outside that field.

It is therefore evident that the contents of the desired fields in registers AR and BR are passed to the adder 10 unchanged, but those parts of the word outside this field, i.e., the remaining parts of the words, are filled by 0's in the case of the input to adder 10 from register AR and by 1's for the input from register BR. Accordingly any carry in bit from flip-flop CO will propagate in adder 10 through the 1's in the space (if any) at the lower end of the word up to the relevant field, so that the carry into the field will be identical to the carry into the bottom end of the adder 10. Similarly, any carry out from the top end of the relevant field will propagate through the 1's in the space (if any) between the top end of the field and the top end of adder 10, and set the carry out flip-flop Cn. Thus the carry out of the adder 10 will be the same as the carry out of the field. The output from the adder 10 will therefore consist of the desired sum in the field, with 0's or 1's on either side depending on whether or not there has been a carry in and/or a carry out. The logic circuit 13 deletes any such 1's outside the field.

Figure 2:
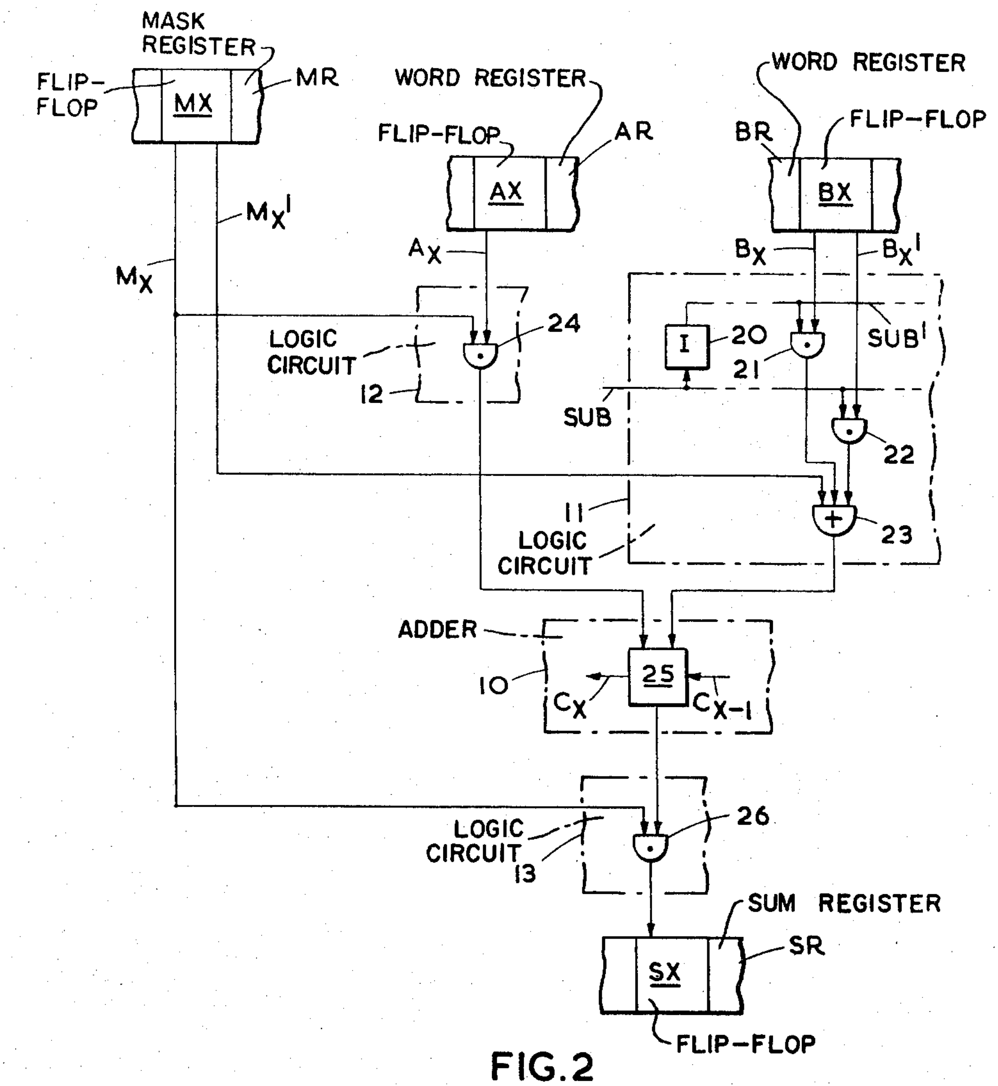
FIG. 2 is a circuit diagram of part of the adder system.

Referring now to FIG. 2, the logic circuits 11, 12 and 13 will be described in more detail. FIG. 2 shows the circuitry for a single bit, the $x$th bit, of the adder system. Flip-flop Bx in register BR provides complementary outputs $B_x$ and $B_x{}^1$, which are applied to two AND gates 21 and 22 in the circuit 11. The logic circuit 11 is controlled by the signal SUB, which is true when subtraction is to be performed and false for addition. This signal SUB is applied to gate 22 and its complement SUB′ (generated by invertor 20) is applied to gate 21. The outputs of gates 21 and 22 are applied, together with the output $M_x^1$ from flip-flop Mx in the mask register MR, to an OR gate 23. The output $A_x$ from flip-flop Ax in register AR is applied together with the output $M_x$ from flip-flop Mx to an AND gate 24 in the logic circuit 12. The outputs from the gates 23 and 24 form the two signals for the x-th bit position which are fed to the adder stage 25 in the adder 10. Stage 25 is a one-bit full adder, receiving also a carry signal $C_{x-1}$ and producing a carry signal $C_x$ and a sum signal which is fed to the logic circuit 13. The logic circuit 13 comprises an AND gate 26 to which this signal is fed together with the signal $M_x$. The output of AND gate 26 is fed to flip-flop Sx of the sum register SR.

It will thus be seen that the additional circuitry required for this system comprises, for each bit position, a mask register flip-flop, two AND gates 24 and 26 and an additional input to the OR gate 23. The gates 21–23 will be present in any case.

The adder 10 has been indicated in FIG. 2 as a chain of one-bit full adders. However, any of the known schemes for speeding-up the formation and propagation of carry signals can be used.

Means must be provided for storing the appropriate mask words defining the various fields which may be used, so that the mask register MR can be set accordingly. A permanent store can be used for this purpose, and the mask register may be simplefied to merely a set of amplifiers on the output from the permanent store. It will also be realized that the circuitry of the logic circuits 11, 12 and 13 may in some cases be simplified if for example a particular bit position is included in every field which may be used.

In order to determine the sign of the result of an addition, or whether an overflow has occurred during an addition, it may be necessary to detect certain conditions at the top end of the field; the value of the most significant bit for the sign, and whether the carry into and the carry out of a most significant bit are equal for the overflow. These signals must be extracted individually from the adder 10, and gated by signals indicating the field, by circuitry not shown. Suitable gating signals can be derived from the mask register by forming the logical products $M_{x-1} \cdot M_x^1$. Similarly, if it is desired to provide a shifting capability, additional circuits must be provided for individual bit positions at each end of the various fields for such matters as cyclic shifts and preservation of sign bits.

It will be appreciated therefore that the present invention provides a technique for filling all positions or digits in an adder, outside a field, with binary 1's. Aside from the system described above, binary 1's may be applied to an adder in the following manner. A binary 1's generator has two outputs, each connected to an OR gate. Two word registers are also connected to the OR gate, respectively, such that a particular field of each word may be applied to each OR gate. The outputs of each OR gate are connected to the adder. In operation, the 1's generator is gated "on" to supply binary 1's to particular digits or positions of the adder, in the absence of fields being read out of the corresponding word registers. While such fields are read out, the 1's generator is gated "off" so that binary 1's are not supplied to the adder. In this manner, all digits or positions in the adder, outside the particular fields, are filled with binary 1's such that a carry-in signal may be injected into the lowest order bit position of the adder and a carry-out signal, if any, may be extracted from the highest order bit position of the adder in a normal manner.

Also, it will be realized that while the radix *r* has been described as binary, any convenient radix may be selected. For example, if a decimal radix is employed, each digit of the word adder outside a particular field will have a decimal "9" entered therein. Since the decimal "9" may be written in binary as 1 – 0 – 0 – 1, for example, although each bit is not a binary "1", the binary representation viewed as a unit or digit, will appear in the adder as $r - 1$ so that carry in or carry out signals may be propagated in a conventional manner.

I claim:

1. A variable field length adding system comprising: a fixed word length adder for digits of radix *r*; digit carry-in and carry-out circuits for the adder; means for registering first and second words; means for applying the contents of the registering means to the adder; means for defining first and second fields in the first and second words respectively; logic means, controlled by said defining means, for restricting the application to the adder of the registering means contents to said fields and for setting stages of the adder outside those occupied by the combined fields with digits of value equal to the radix minus one to enable a carry-in signal injected by the carry-in circuit into the least significant digit of the adder to be carried into the least significant digit end of the added fields and to enable a carry-out from the most significant digit end of the added fields to carry-out from the most significant digit end of the adder into the carry-out circuit.

2. A system as claimed in claim 1 in which said radix *r* is binary and in which all digits in said adder stages outside those occupied by the added fields are set to a binary '1' state.

3. A system as claimed in claim 2, in which the registering means includes a first register having a word length including the first field and a second register having a word length including the second field, and in which the logic means includes means for setting each digit of the output from the first register outside the first field to a binary '0' state and means for setting each digit of the output from the second register to a binary '1' state, said digits being set to said '0' and '1' states respectively, before said words are fed to said adder.

4. A system as claimed in claim 1 in which said first and second fields are equal in length and are of a length less than a word length.

* * * * *